Patented Nov. 16, 1948

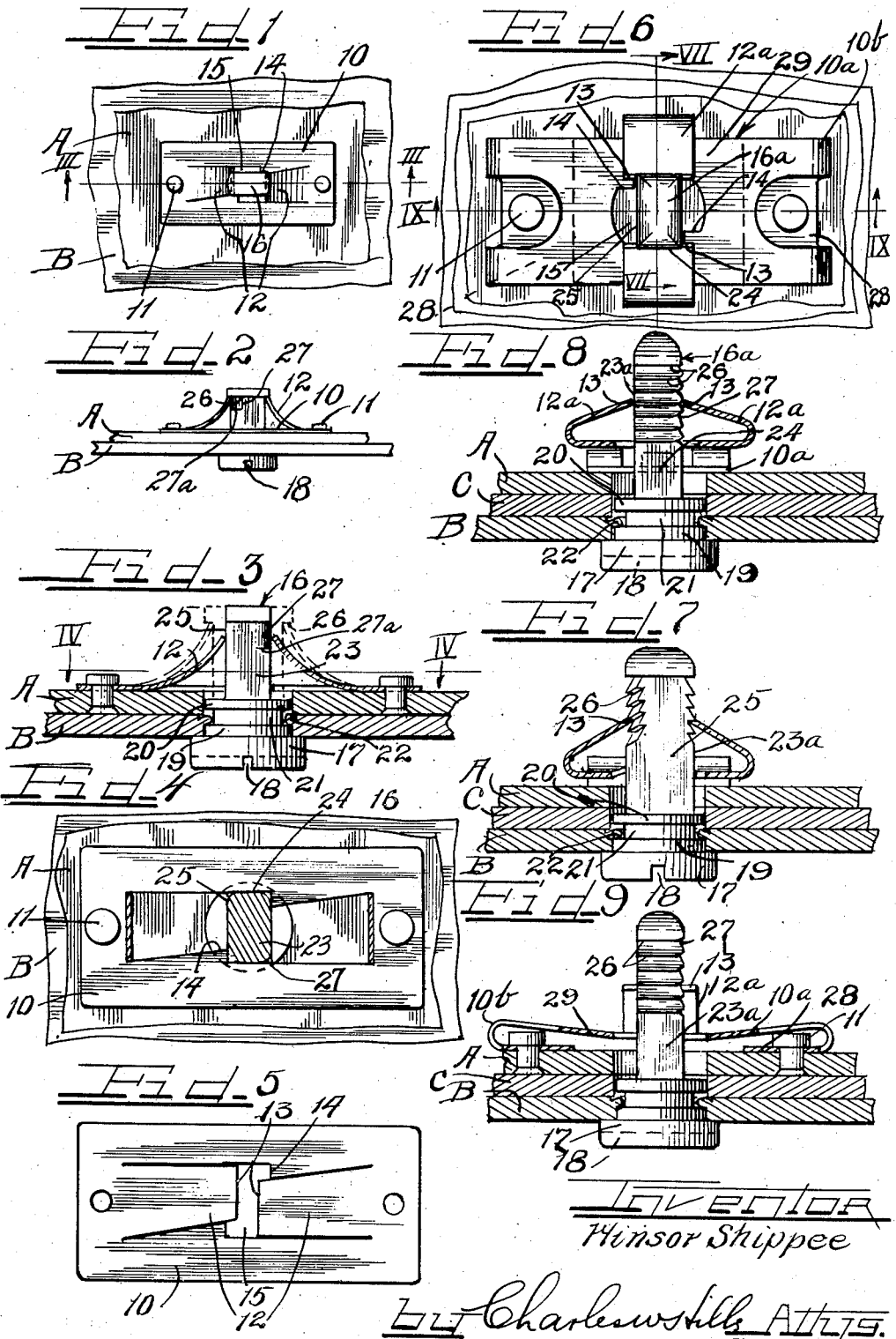

2,454,223

UNITED STATES PATENT OFFICE 2,454,223

ROTATABLE SEPARABLE FASTENER

Winsor Shippee, Fair Haven, N. J.

Application August 9, 1944, Serial No. 548,693

5 Claims. (Cl. 24—221)

This invention relates to a separable fastener for detachably securing together a plurality of separate parts, such for example as inspection plates, aircraft cowlings and the like.

More specifically, the invention relates to a fastener comprising a locking stud and a receptacle for the stud having triple functioning spring arms which simultaneously pull the stud into the receptacle, hold the stud against retraction from the receptacle, and lock the stud in connected relation with the receptacle.

It is an object of this invention to provide a fastener embodying a receptacle having spring fingers which not only detachably secure a cooperating fastener member to the receptacle, but also hold this member against unintended rotation.

It is another object of the invention to provide a fastener including a receptacle having securing means which upon being spread by a cooperating fastening member draw this member tightly into secured position.

It is a further object of this invention to provide a fastener including a receptacle having spring arms the stiffness of which is increased by reason of increasing curvature thereof as they assume locking position.

It is also an object of this invention to provide a universal fastener which will securely hold in assembled relation a plurality of parts having varied overall thicknesses.

It is still another object of this invention to provide a fastener stud and receptacle assembly wherein complicated and expensive stud shapes are avoided and wherein the receptacle is stamped from metal strip stock with a minimum loss of metal.

An important feature of this invention is the provision of a fastener including a resilient member and a cooperating stud member in which spring arms of the resilient member are forced apart and away from the secured part by rotation of the stud member, such movement of the arms increasing the tension thereof to hold the stud securely in its part-locking position, drawing the stud in an axial direction, and at the same time securely locking the stud against unintentional rotation.

Other and further objects and advantages of this invention will be apparent to those skilled in the art from the following description and the appended drawings.

In the drawings:

Figure 1 is a plan view of the fastener in locked position;

Figure 2 is a side elevational view of the fastener in locked position;

Figure 3 is an enlarged vertical longitudinal cross-sectional view, with parts in elevation, taken on the line III—III of Figure 1;

Figure 4 is a plan view with parts in horizontal cross-section taken on the line IV—IV of Figure 3;

Figure 5 is a plan view of the blank for the fastener shown in Figures 1 to 4, inclusive;

Figure 6 is a plan view of a modified form of fastener in locked position;

Figure 7 is a transverse vertical cross-sectional view, with parts in elevation, taken on the line VII—VII of Figure 6;

Figure 8 is a view similar to Figure 7, but showing the elements in unlocked position; and Figure 9 is a sectional view, with parts in elevation, taken on the line IX—IX of Figure 6.

The fastener of this invention is illustrated as employed to secure together a plurality of plates, although as already indicated the invention is not limited to such use.

In the form of the invention illustrated in Figures 1 to 5, inclusive, a plate 10 of resilient material, such as spring steel, is secured in any suitable manner, as by rivets 11, to one of the parts to be fastened, as the plate A. Tongues or spring fingers 12 are stamped or otherwise integrally formed from the body of the plate 10 and curve upwardly as shown in the drawings with their free ends 13 in spaced opposed relation. As best shown in Figures 4 and 5, the spring fingers 12 formed from the plate 10 have their edges 13 offset slightly, so that lugs 14 are formed in the plate 10 to project into a central aperture 15 to limit rotational movement of the stud member of the fastener extending through the aperture.

A stud 16 is rotatably mounted in another of the parts to be secured together, as the plate B. The stud 16 has a head 17 which may have a screw-driver slot 18 or the like therein, and a bead or the like 19 formed about the stem of the stud adjacent the head. A radial flange 20 is formed on the stem spaced from the bead 19, providing a securing groove 21 between the bead 19 and the flange 20. The plates A and B have registering circular apertures therein, and the material about the aperture of plate B is deformed into groove 21, as at 22, to hold the stud 16 rotatably mounted in the plate B.

The stud 16 extends through the apertures in the plates A and B and through the aperture 15 in the plate 10. The shank 23 of the stud has major and minor axes and is preferably rectangular, with two narrow faces 24 and two wide faces 25. On each narrow face 24 there is formed a projecting shoulder or ledge 26 of a size sufficient to retain the edge 13 of the spring finger 12. The space between the edges 13 of the spring fingers 12 is sufficient to receive the shank 23 freely when the wide faces 25 are parallel to the edges 13, but insufficient to receive the shank when the narrow faces 24 are adjacent the edges 13 unless the spring fingers 12 are deflected.

At least two diagonally opposite corners of the shank 23 are rounded or beveled as at 27 for at least the axial distance between the ledge 26 and the unstressed position of the spring finger edge 13 when positioned for the fastening operation. The shoulder 27a (Figure 3) indicates the termination of beveled portion 27. The beveled corner is topped by the continuation of ledge 26. The corners which are rounded are those which engage the spring fingers 12 upon rotation of the stud 16, it being borne in mind that the lugs 14 limit the rotation of the stud.

In operation, when the parts A and B have been placed in a position in which they are to be secured, with the stud projecting through the apertures therein and the shank extending between the edges 13 with the faces 25 parallel thereto, rotation of the stud 16 counter-clockwise as shown in Figures 3 and 4 will spread the edges 13 of the spring fingers 12 as the narrow faces 24 are brought parallel to the edges 13, and the wide faces 25 are brought substantially normal thereto. As the edges 13 are spread apart by rotation of the stud, they ride upwardly along the rounded corners 27 and the narrow faces 24 into engagement with the ledges 26. The tension of the spring fingers 12 is, of course, increased as they are spread and this spreading causes the fingers to curve into a steeper concave shape which stiffens the fingers against movement toward the plate 10. When the ledges 26 are engaged by the edges 13 of these fingers, the stud is pulled into the receptacle and held against retraction by the stiff fingers. The head 17 of the stud 16 is drawn tightly against the plate B and the plates A and B are resiliently and tightly clamped between the head 17 and the plate 10. At the same time, the tension of the spring fingers 12 locks the stud 16 against rotation by the engagement of the edges 13 against the narrow faces 24. The engagement of the edges 13 of the stiffened spring fingers 12 against the ledges 26 also holds the stud 16 against withdrawal axially. The wide faces of the stud engage against the lugs 14 to prevent further counter-clockwise rotation of the stud after the narrow faces have come into full engagement with the edges 13, so that the stud will not be inadvertently rotated too far.

As should be obvious, the axial distance between the ledges 26 and the plate A, and the length of the spring fingers 12, are so proportioned as to insure the edges 13 tightly engaging the ledges 26 under considerable tension when the stud is rotated into locking position. The fingers thus not only draw the stud into the receptacle but hold it therein and lock it against unauthorized rotation.

In Figures 6 to 9, inclusive, there is illustrated another form of the invention adapted for use in fastening together assemblies of parts of varying thicknesses. This form of the fastener is illustrated as employed to secure together an innermost plate A, an outermost plate B, and an intermediate plate C. It will be understood that the plate C might be omitted, or might be of varying thicknesses, or that several intermediate plates might be included. This form of the invention is adapted to accommodate itself to a wide range of overall thickness of parts to be secured together.

A resilient member 10a is utilized which is of somewhat different form from the resilient plate 10 of the first form of the invention. The resilient member 10a has its end portions bowed to provide bent spring portions 10b and foot portions 28 which are secured to the innermost plate A as by rivets 11. The main or plate portion 29 of the resilient member 10a is thus spaced from the plate A and can be deflected toward plate A through flexing of the bowed spring portions 10b. A central aperture 15 and lugs 14 are provided as in the first-described form. Spring fingers 12a extend from the sides of the plate 29 and are bent to extend toward each other and inwardly of the plate A with their edges 13 spaced from each other above the aperture 15.

A stud 16a with a head portion similar to that of the stud 16 of the first form of the invention is secured in the outermost plate B in the same manner as the stud 16. The shank 23a of the stud 16a is substantially similar to the shank 23 of the stud 16, but is of greater length and has a plurality of teeth providing shoulders or ledges 26 on each of its narrow faces 24, each of such ledges 26 extending around the stud sufficiently to top the rounded corners 27, instead of a single ledge as in the first form of the invention.

The operation of this form of the invention is substantially similar to that of the first form, but assures secure locking of the fastener regardless of the overall thickness of the parts secured, within a wide range of variation. As the stud 16a is rotated counter-clockwise as shown in the drawings, the edges 13 of the spring fingers 12a are engaged by the rounded corners 27 and spread apart while being urged inwardly of the plate A. Each edge 13 engages against a ledge 26 on a narrow face 24 of the shank 23a, as in the first form of the invention. The particular ledge which is engaged by each edge 13 is determined by the thickness of the parts being secured together. Thus, if the plate C were omitted or were thinner than shown, the edges 13 would engage ledges 26 nearer to the head portion of the stud than illustrated, and if the plate C were thicker than shown or if additional intermediate plates were included, the edges 13 would engage against ledges 26 farther from the head portion of the stud than illustrated. The tension of the spring fingers 12a is increased in the manner explained in connection with the spring fingers 12 of the first form of the invention, and the stud drawn into the receptacle, held against retraction, and locked against rotation to unlocking position, by the pressure of the spring fingers. The lugs 14 act as stops to limit rotation of the studs, as in the first-described form.

If the thickness of the secured parts is such that the ledges to be engaged by the spring finger edges 13 are at levels well above or outward from the spring finger edges, rotation of the stud will spread the arms as in Figures 1 to 5 and tension on the spring fingers 12a will not be excessive. If the thickness of the secured parts, however, is such that the ledges to be engaged are level with or just above the edges 13, the rotation of the stud will so tension and rigidify the spring fingers 12a that a substantial portion of the tension will be transmitted to the plate portion 29 causing the plate to deflect toward the stud head.

In effect, mounting of the plate portion 29 on feet through bowed spring portions produces a resilient base for the spring arms to compensate for misalignments between the stud ledges and spring arm edges.

It is obvious that a very simple fastener has been provided which is inexpensive to manufacture and easy to apply and operate. In the first form of the invention, particularly, the resilient plate 10 is very simple and cheap to manufacture, since as shown in Figure 5 the blank may be readily stamped from sheet stock in a single operation. In the second-described form of the invention, the resilient plate 10a, although not as simple as the plate 10, may readily be stamped from sheet stock and the foot portions 28 and spring fingers 12a bent to the desired shape. Similarly, the stud in each form of the invention is simply and inexpensively made.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A fastener comprising a pair of resilient arms with free ends in spaced opposed relation, a stud extending between said ends adapted upon rotation to deflect said arms, abutments on said stud engageable by saids ends upon said deflection, and means connected with said resilient arms limiting rotation of said stud.

2. A fastener comprising a rotatable stud having an upstanding shank oblong in cross section, rounded corners on said shank, shoulders extending across said rounded corners and the narrow faces of said shank. a pair of resilient tongues having the free ends thereof in opposed parallel offset relation adjacent opposed faces of said shank, said tongues being adapted for upward deflection by said rounded corners upon rotation of said stud to engage said narrow faces and said ends, and said ends resiliently seating on said shoulders upon said deflection, and abutment means formed by the secured end portions of said tongues to limit rotation of said stud, said stud being held against rotation out of engagement with said abutment means by said offset tongue ends when seated on said shoulders.

3. In a fastening device adapted to fasten together two apertured plates, a spring having inwardly and downwardly turned ends secured to one of said plates, upwardly and inwardly turned spring fingers formed on the central part of said spring, said spring having an aperture between said fingers, a shoulder in said aperture, a stud projecting through the apertures in both of said plates, and through the aperture in said spring, means on said stud engageable with said spring fingers upon rotation of said stud to secure the plates together, and stop means on said stud engageable with said abutments to limit the rotation of said stud.

4. In a fastening device adapted to fasten together a plurality of apertured plates, a spring having inwardly and downwardly turned ends secured to one of said plates, upwardly and inwardly turned spring fingers formed on the central part of said spring, said spring having an aperture in the body of the spring between said fingers, a shoulder in said aperture, a stud projecting through the apertures in said plates and through the aperture in said spring, locking ledges in opposed faces of said stud engageable with said spring fingers upon rotation of said stud to secure the plates together, and stop means on said stud engageable with said shoulder to limit rotation of said stud.

5. In a fastening device adapted to fasten together a plurality of apertured plates, a spring having inwardly and downwardly turned ends secured to one of said plates, upwardly and inwardly turned spring fingers formed on the central part of said spring with the free inner ends thereof spaced from each other, said spring having an aperture in the body thereof between said fingers, a shoulder in said aperture, a stud projecting through the apertures in said plates and through the aperture in said spring, locking ledges on opposed faces of said stud engageable with the spaced free ends of said spring fingers upon rotation of said stud to secure the plates together, and stop means on said stud engageable with said shoulder to limit the rotation of said stud.

WINSOR SHIPPEE.

REFERENCES CITED

The following references are of record in the file of this patent:

UNITED STATES PATENTS

| Number | Name | Date |
| --- | --- | --- |
| 1,890,348 | Weatherhead, Jr. | Dec. 6, 1932 |
| 2,183,085 | Richardson | Dec. 12, 1939 |
| 2,200,702 | Oddie | May 14, 1940 |
| 2,230,916 | Tinnerman | Feb. 4, 1941 |
| 2,252,286 | Hathorn | Aug. 12, 1941 |
| 2,334,188 | Gazley | Nov. 16, 1943 |
| 2,337,483 | Marty | Dec. 21, 1943 |
| 2,342,170 | Tinnerman | Feb. 22, 1944 |
| 2,372,496 | Huelster | Mar. 27, 1945 |
| 2,419,108 | Barlow | Apr. 18, 1947 |